(12) United States Patent
Sugimoto et al.

(10) Patent No.: US 7,184,652 B2
(45) Date of Patent: Feb. 27, 2007

(54) DIGITAL VIDEO RECORDING/REPRODUCTION APPARATUS AND PROGRAM THEREFOR

(75) Inventors: Keishi Sugimoto, Okazaki (JP); Naoe Kato, Toyota (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1165 days.

(21) Appl. No.: 10/199,060

(22) Filed: Jul. 22, 2002

(65) Prior Publication Data

US 2003/0021587 A1    Jan. 30, 2003

(30) Foreign Application Priority Data

Jul. 27, 2001    (JP)    ............... 2001-227440

(51) Int. Cl.
*H04N 5/91*    (2006.01)
(52) U.S. Cl. ............... 386/98; 386/46; 386/125; 725/109
(58) Field of Classification Search ............... 386/1, 386/45, 46, 98, 111, 112, 124–126; 348/231.1, 348/231.2; 725/32, 109, 119
See application file for complete search history.

(56) References Cited

U.S. PATENT DOCUMENTS

| | | | |
|---|---|---|---|
| 5,835,493 A | 11/1998 | Magee et al. | |
| 5,844,595 A | 12/1998 | Blatter et al. | |
| 5,917,830 A * | 6/1999 | Chen et al. ............... | 348/473 |
| 6,785,733 B1 * | 8/2004 | Mimura et al. ............... | 725/109 |
| 6,879,768 B1 * | 4/2005 | Ono et al. ............... | 386/46 |
| 6,920,279 B2 * | 7/2005 | Hatanaka et al. ............... | 386/98 |
| 6,950,604 B1 * | 9/2005 | Kato et al. ............... | 386/125 |

FOREIGN PATENT DOCUMENTS

| | | |
|---|---|---|
| EP | 0 712 257 | 5/1996 |
| GB | 2 333 017 | 7/1999 |
| JP | 07-327199 | 12/1995 |
| WO | 98/16067 | 4/1998 |

OTHER PUBLICATIONS

"Digital Video Broadcasting (DVB); Specification for Service Information (SI) in DVB Systems", Draft ETSI EN 300 468 V1.4.1, XX, XX, Nov. 2000, pp. 1-83, XP002202951.

* cited by examiner

*Primary Examiner*—James J. Groody
*Assistant Examiner*—Christopher Onuaku
(74) *Attorney, Agent, or Firm*—Wenderoth Lind & Ponack, L.L.P.

(57) ABSTRACT

There is provided a digital video recording/reproduction apparatus which can precisely perform a reproduction process while preventing noise generation even when a program has been recorded in overwriting fashion, such being realized by detecting a discontinuous portion in the stream at the time of reproduction. A PMT_PID or an ES_PID contained in each packet of a partial TS is recorded on a recording medium so as to take a different value each time there is a discontinuity in a stream. As a result, in a reproduction process of a recording medium which has been recorded in this manner, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated.

12 Claims, 13 Drawing Sheets

|  | ORIGINAL PID | CONVERTED PID |
|---|---|---|
| PMT | 5 | 106 |
| VIDEO ES | 20 | 107 |
| AUDIO ES | 8 | 108 |

F I G. 1 3 PRIOR ART

F I G. 1 5  PRIOR ART
| DATA NAME | DIT | | | | | | |
|---|---|---|---|---|---|---|---|
| | table id | section syntax indicator | reserved future use | reserved | section length | transition flag | reserved future use |
| BIT NUMBER | 8 | 1 | 1 | 2 | 1 2 | 1 | 7 |
F I G. 1 6 A  PRIOR ART
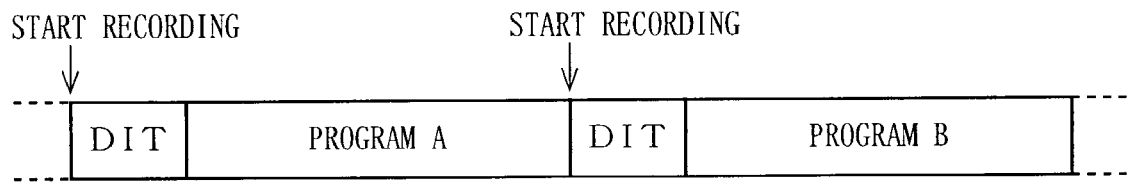
F I G. 1 6 B  PRIOR ART
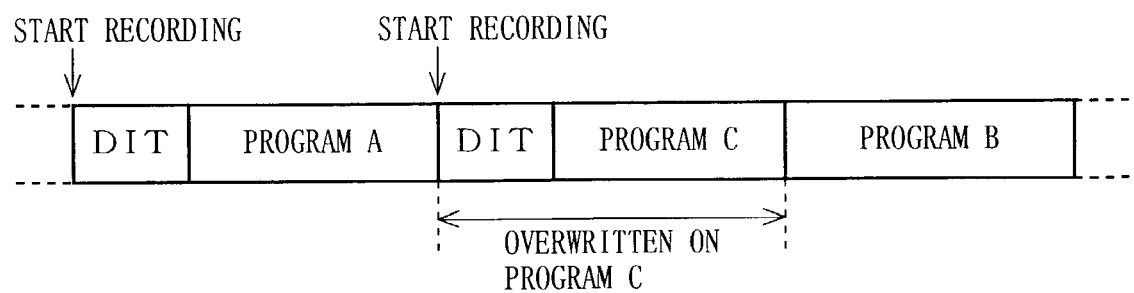

DIGITAL VIDEO RECORDING/REPRODUCTION APPARATUS AND PROGRAM THEREFOR

BACKGROUND OF THE INVENTION

1. Field of the Invention

The present invention relates to a digital video recording/reproduction apparatus and a program therefor. More particularly, the present invention relates to a digital video recording apparatus for recording on a recording medium a digital broadcast program received by a digital broadcast receiver, and a program for realizing the recording processing, and also to a digital video reproduction apparatus for reproducing a digital broadcast program recorded on a recording medium, and a program for realizing the reproduction process.

2. Description of the Background Art

As is well known in the art, a digital broadcast receiver receives a digital broadcast signal in which a plurality of programs are multiplexed, and decodes a selected one of the programs so as to reproduce the program by means of a monitor and/or a loudspeaker. In order to allow a selected program to be recorded on a predetermined recording medium (e.g., a magnetic tape medium such as DVHS tape, or an optical disk such as a DVD), a digital broadcast receiver also outputs a signal representing the program to a digital video recording/reproduction apparatus via a digital interface. The output to a digital video recording/reproduction apparatus is in the form of a partial transport stream (hereinafter referred to as a "partial TS").

A partial TS includes packets composing video and audio elementary streams and packets containing predetermined information tables (control data). Hereinafter, an "elementary stream" will be abbreviated as "ES".

Information tables to be contained in a partial TS may be in data formats such as a Program Association Table (hereinafter abbreviated as "PAT") and a Program Map Table (hereinafter abbreviated as "PMT") as defined under STD-B10, and a Discontinuity Information Table (hereinafter abbreviated as "DIT") and a Selection Information Table (hereinafter abbreviated as "SIT") as defined under STD-B21, both proposed by the ARIB (Association of Radio Industries and Businesses).

FIGS. 12 to 15 illustrate the respective information table formats.

As shown in FIG. 12, a PAT contains a service identifier (program_number) of a service to be carried via a given partial TS (hereinafter referred to as a "target service"), a packet identifier of a PMT (program_map_PID: hereinafter abbreviated as "PMT_PID"), and the like. As shown in FIG. 13, a PMT contains a service identifier (program_number) of a target service, a packet identifier of a program clock reference (hereinafter abbreviated as "PCR") (PCR_PID), a packet identifier of a TS packet which carries the ES or payload of a target service (elementary_PID: hereinafter abbreviated as "ES_PID"), and the like. A DIT is to be inserted where a partial TS becomes discontinuous or where the number of ES's contained in a given partial TS increases or decreases. As shown in FIG. 15, a DIT contains a transition flag (transition_flag) which represents the type of change occurring in the transport stream.

A conventional digital video recording/reproduction apparatus which utilizes magnetic tape as a recording medium records a digital broadcast program received by means of a digital broadcast receiver in such a manner that, each time recording is started, a DIT is recorded at the beginning of each recorded region to indicate a discontinuity in the recorded programs. FIG. 16A schematically illustrates how DIT's may be recorded a recording medium in the case where program B is recorded following program A.

When a recording medium on which programs are recorded in this manner is reproduced through the discontinuous portion, a conventional digital video recording/reproduction apparatus detects the recorded DIT and knows that programs have been recorded in a discontinuous manner based on the content of the DIT. Then, the conventional digital video recording/reproduction apparatus redetects video information and audio information which are necessary for reproduction, as well as a PCR for synchronizing the video information with the audio information. Thus, the conventional digital video recording/reproduction apparatus is controlled so that a reproduction process can properly occur when going through a discontinuous portion.

In the above-described conventional digital video recording/reproduction apparatus, DIT's are recorded only at the beginning of recording. Therefore, while a discontinuous portion can be properly detected if programs are recorded on a recording medium program without overlap, such is no longer the case if a new program is overwritten on an already-recorded region. For example, as shown in FIG. 16B, if a new program C is overwritten part of the way down a program A and part of the way into the following program B, then a DIT which was recorded at the beginning of program B will be erased. Thus, a conventional digital video recording/reproduction apparatus has a problem in that, when program C and program B are consecutively reproduced, the discontinuous portion between program C and program B cannot be properly detected, making it impossible to allow a proper reproduction process to occur for the remaining recorded portion of program B.

One cure for this problem might be recording a DIT at the end of recording also. However, such technique would result in a waste of recording area on the recording medium. Moreover, there is a problem with respect to responsiveness to a user in that, when an instruction to stop recording is issued by a user, the recording operation can stop only after a DIT is recorded.

SUMMARY OF THE INVENTION

Therefore, an object of the present invention is to provide a digital video recording/reproduction apparatus and a program therefor which can precisely perform a reproduction process while preventing noise generation even when a program has been recorded in overwriting fashion, such being realized by detecting a discontinuous portion in the stream at the time of reproduction and without resorting to the technique of recording a DIT at the end of a recording.

The present invention has the following features to attain the object above.

A first aspect of the present invention is directed to a digital video recording apparatus for recording a digital video signal on a recording medium, the digital video signal being inputted in packets, comprising: a PID conversion table having registered therein information for converting a PID (packet identifier) assigned to a packet composing the digital video signal; a table initialization section for initializing the PID conversion table in response to an instruction to start recording or a switching of services provided in the inputted digital video signal; a PID detection section for detecting a PID assigned to each inputted packet of the digital video signal, and for a packet determined as containing control data or video/audio data based on the detected PID, registering a value which is different from a current value as a converted PID for the packet in the PID conversion table; a PID conversion section for converting the PID of an inputted packet and the PID of the control data or video/audio data contained therein to the converted PID in accordance with the registered information in the PID conversion table; and a recording section for recording the packet whose PID has been converted by the PID conversion section on the recording medium.

Thus, according to the first aspect, a PID (e.g., PMT_PID or ES_PID) of control data or video/audio data contained in each packet of a digital video signal (partial TS) is recorded on a recording medium so as to take a different value each time there is a discontinuity in a stream. As a result, in a reproduction process of a recording medium which has been recorded in this manner, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated.

In the first aspect, the PID to be registered by the PID detection section in the PID conversion table is preferably at least one of: the PID of a packet containing a PMT; and the PID of a packet containing a video/audio ES.

It is preferable that the ID detection section sequentially employs a value incremented from a predetermined arbitrary value as a converted PID to be registered in the PID conversion table, and each incremented value is stored in a non-volatile memory and read out for use from the non-volatile memory when the apparatus is turned on. By employing such values as the converted PID's, it can be ensured that no PID will be used twice.

A second aspect of the present invention is directed to a A digital video reproduction apparatus for reproducing a digital video signal recorded in a file format on a recording medium in packets, comprising: a PID conversion table having registered therein information for converting a PID (packet identifier) assigned to a packet composing the digital video signal; a table initialization section for initializing the PID conversion table in response to a change of file numbers which are read; a PID detection section for detecting a PID assigned to each read packet of the digital video signal, and for a packet determined as containing control data or video/audio data based on the detected PID, registering a value which is different from a current value as a converted PID for the packet in the PID conversion table; a PID conversion section for converting the PID of a read packet and the PID of the control data or video/audio data contained therein to the converted PID in accordance with the registered information in the PID conversion table; and an output section for reproducing and outputting the packet whose PID has been converted by the PID conversion section.

Thus, according to the second aspect, a PID (e.g., PMT_PID or ES_PID) of control data or video/audio data contained in each packet of a digital video signal (partial TS) is reproduced from a recording medium so as to take a different value each time there is a discontinuity in a stream. As a result, in a reproduction process of a recording medium which has been recorded in this manner, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated. This is especially useful for recording media which manage recordable contents in a file format, e.g., HDD's and DVD's.

A third aspect of the present invention is directed to a digital video reproduction apparatus for reproducing a digital video signal recorded on a recording medium, comprising: a unrecorded portion detection section for reading the digital video signal recorded on the recording medium and detecting an unrecorded portion in the digital video signal; an output section for outputting the digital video signal having been read to a decoder; and a notification section for notifying, if an unrecorded portion is detected by the unrecorded portion detection section, a stream discontinuity to the decoder.

In this case, if an unrecorded portion is detected by the unrecorded portion detection section, the notification section may insert or overwrite predetermined discontinuity information in or on the digital video signal having been read to notify a stream discontinuity to the decoder.

The discontinuity information used is preferably a DIT or a PAT not containing a PMT_PID.

Thus, according to the third aspect, unrecorded portions which are conventionally present on a recording medium are detected, and discontinuity information is inserted in or overwritten on a digital video signal (partial TS) every time a discontinuity occurs in a stream. As a result, in a reproduction process of a conventional recording medium, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated.

A fourth aspect of the present invention is directed to a program for causing a computer apparatus to execute a method of recording a digital video signal on a recording medium, the digital video signal being inputted in packets, comprising the steps of: determining an instruction to start recording or a switching of services provided in the inputted digital video signal; in response to the instruction or switching, initializing a PID conversion table which has registered therein information for converting a PID (packet identifier) assigned to a packet composing the digital video signal; detecting a PID assigned to each inputted packet of the digital video signal; for a packet determined as containing control data or video/audio data based on the detected PID, registering a value which is different from a current value as a converted PID for the packet in the PID conversion table; converting the PID of an inputted packet and the PID of the control data or video/audio data contained therein to the converted PID in accordance with the registered information in the PID conversion table; and recording the packet whose PID has been converted by the step of converting on the recording medium.

In the fourth aspect, it is preferable that the step of registering comprises sequentially employing a value incremented from a predetermined arbitrary value as a converted PID to be registered in the PID conversion table, and storing each incremented value in a non-volatile memory and reading out the incremented value from the non-volatile memory for use when the apparatus is turned on.

The fifth aspect of the present invention is directed to a program for causing a computer apparatus to execute a method of reproducing a digital video signal recorded in a file format on a recording medium in packets, comprising the steps of: determining a change of file numbers which are read; in response to the change, initializing a PID conversion table which has registered therein information for converting a PID (packet identifier) assigned to a packet composing the digital video signal; detecting a PID assigned to each read packet of the digital video signal; for a packet determined as containing control data or video/audio data based on the detected PID, registering a value which is different from a current value as a converted PID for the packet in the PID conversion table; converting the PID of a read packet and the PID of the control data or video/audio data contained therein to the converted PID in accordance with the registered information in the PID conversion table; and reproducing and outputting the packet whose PID has been converted.

A sixth aspect of the present invention is directed to a program for causing a computer apparatus to execute a method of reproducing a digital video signal recorded on a recording medium, comprising the steps of: reading the digital video signal recorded on the recording medium; detecting an unrecorded portion in the digital video signal; outputting the digital video signal having been read to a decoder; and if an unrecorded portion is detected by the step of detecting, notifying a stream discontinuity to the decoder.

In this case, the step of notifying may comprise, if an unrecorded portion is detected by the step of detecting, inserting or overwriting predetermined discontinuity information in or on the digital video signal having been read to notify a stream discontinuity to the decoder.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a diagram illustrating a DIT format; and

FIGS. 16A and 16B are conceptual illustrations of how a partial TS may be recorded on a recording medium 210 through conventional processing.

DESCRIPTION OF THE PREFERRED EMBODIMENTS

Hereinafter, illustrative embodiments of the present invention will be described with reference to the accompanying figures.

(First Embodiment)

Figure 1:
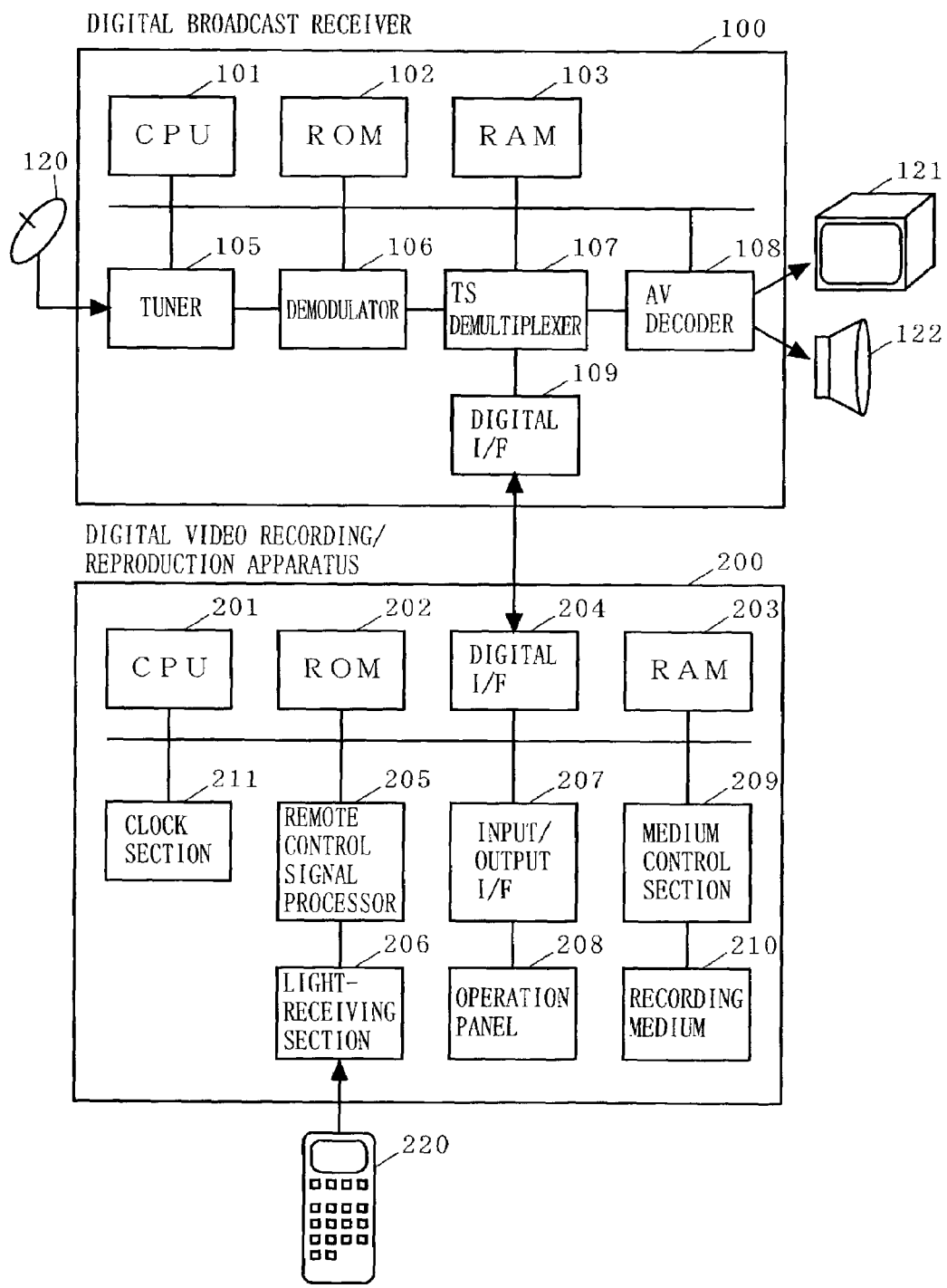
FIG. 1 is a block diagram illustrating the structure of a digital video recording/reproduction apparatus according to a first embodiment of the present invention.

FIG. 1 is a block diagram illustrating the structure of a digital video recording/reproduction apparatus 200 according to a first embodiment of the present invention. Also shown in FIG. 1 is a digital broadcast receiver 100, which outputs a partial TS so as to be supplied to the digital video recording/reproduction apparatus 200.

(1) Overview of the Digital Broadcast Receiver 100

The digital broadcast receiver 100 comprises an antenna 120, a tuner 105, a demodulator 106, a TS demultiplexer 107, an AV decoder 108, a digital interface (digital I/F) 109, a CPU 101, a ROM 102, and a RAM 103.

The digital broadcast receiver 100 receives a video signal containing information of various programs which are transmitted from a broadcast station (not shown), and allows a selected one of the programs to be viewed by a user. In addition, the digital broadcast receiver 100 generates a partial TS to be recorded by the digital video recording/reproduction apparatus 200. Any such "program", which includes not only the audio and video actually composing the program but also electronic program information (EPG), data broadcast, and the like, will hereinafter be simply referred to as a "program".

The digital broadcast receiver 100 receives at the antenna 120 a video signal which is radio-transmitted from a broadcast station, and outputs a synchronization signal for a channel which is selected by means of the tuner 105. The demodulator 106 converts this synchronization signal into a digital signal. The TS demultiplexer 107 separates a plurality of information elements which are multiplexed in the digital signal. As used herein, the "information elements" may include information composing a program, e.g., video/audio and electronic program information, a PAT which lists programs which are contained in the digital data, a PMT representing the construction of each individual program, and the like. Among the information elements separated by the TS demultiplexer 107, the audio and video are converted by the AV decoder 108 into analog information which is capable of being viewed and/or listened to, and reproduced on a monitor 121 and/or a loudspeaker 122. The information elements which are to be recorded on a recording medium are outputted as a partial TS, via the digital interface 109, to the digital video recording/reproduction apparatus 200.

When reproducing a program which has been recorded by the digital video recording/reproduction apparatus 200, the digital broadcast receiver 100 receives a partial TS which is inputted from the digital video recording/reproduction apparatus 200 via the digital interface 109. This partial TS is separated by the TS demultiplexer 107 into individual information elements, and the audio and video are converted by the AV decoder 108 into analog information which is capable of being viewed and/or listened to.

The above-described series of controls made by the digital broadcast receiver 100 are realized by the CPU 101 while utilizing the RAM 103 as a main work area. A program to be executed by the CPU 101, which describes the control processes, is stored in the ROM 102.

(2) Overview of the Digital Video Recording/Reproduction Apparatus 200

The digital video recording/reproduction apparatus 200 comprises a light-receiving section 206, a remote control signal processor 205, an operation panel 208, an input/output interface (input/output I/F)207, a medium control section 209, a recording medium 210, a clock section 211, a digital interface (digital I/F)204, a CPU 201, a ROM 202, and a RAM 203.

The digital video recording/reproduction apparatus 200 is designed for the purposes of recording on the recording medium 210 a partial TS which is inputted from the digital broadcast receiver 100 via the digital interface 204 and the medium control section 209, and outputting a partial TS recorded on the recording medium 210 to the digital broadcast receiver 100. As the recording medium 210, any of various types of media that is capable of data recording can be used, e.g., magnetic tape, a magnetic disk, an optical disk.

An operational instruction from a user which is inputted via the operation panel 208 is subjected to processing by the CPU 201 via the input/output interface 207. An operational instruction which is inputted via the remote control 220 is subjected to processing by the CPU 201 via the light-receiving section 206 and the remote control signal processor 205.

The above-described series of controls made by the digital video recording/reproduction apparatus 200 are realized by the CPU 201 while utilizing the RAM 203 as a main work area. A program to be executed by the CPU 201, which describes the control processes, is stored in the ROM 202.

(3) Detailed Description of a Recording Operation by the Digital Video Recording/Reproduction Apparatus 200

Figure 2:
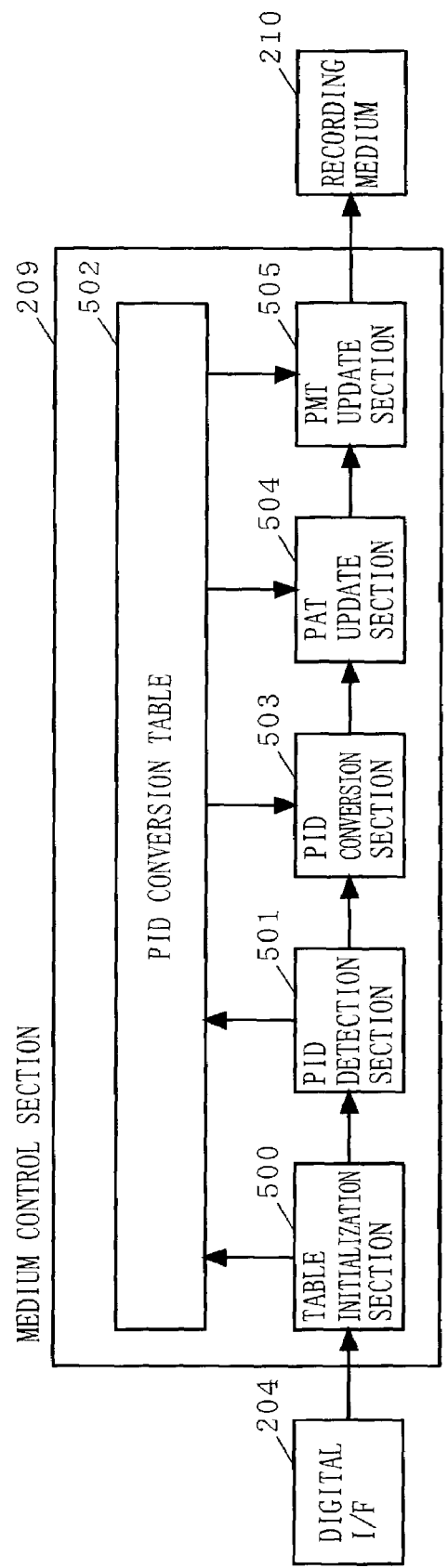
FIG. 2 is a block diagram showing the detailed structure of a medium control section 209 according to the first embodiment of the present invention.

FIG. 2 is a block diagram showing the detailed structure of the medium control section 209, which needs to be utilized during recording, in the digital video recording/reproduction apparatus 200. As shown in FIG. 2, the medium control section 209 comprises a table initialization section 500, a PID detection section 501, a PID conversion table 502, a PID conversion section 503, a PAT update section 504, and a PMT update section 505.

The table initialization section 500 monitors the partial TS which is inputted from the digital interface 204 and any recording operations made, and initializes (or clears) the PID conversion table 502 if it is determined that the partial TS has been switched or if a recording has been started. The PID detection section 501 detects a PID assigned to each packet in the partial TS outputted from the table initialization section 500, and determines a packet containing a PMT and/or a packet containing an ES (e.g., video ES, audio ES, data ES, or superimposed caption ES). The PID conversion table 502 stores information which is utilized to convert the PID of a packet containing a PMT or an ES, as determined by the PID detection section 501, to a different PID. Based on the registered content in the PID conversion table 502, the PID conversion section 503 converts the PID of the packet containing a PMT or an ES. The PAT update section 504 and the PMT update section 505 update the contents of a PAT and a PMT, respectively, according to the change of PID of the corresponding packet.

The processes performed by the digital video recording/reproduction apparatus 200 according to the present invention can be characterized as follows. The medium control section 209 records the PMT_PID or ES_PID contained in each packet of a partial TS on the recording medium 210 in such a manner that PMT_PID or ES_PID takes a different value each time there is a discontinuity in the stream. As used herein, a "discontinuity in a stream" occurs when a recording is started, or when a service in the inputted stream is switched. The former case would involve an operation being made by means of the operation panel 208 or the remote control 220, or a start of recording being instructed from the digital broadcast receiver 100. The latter case would involve the service being switched by the digital broadcast receiver 100, e.g., when the input is switched from a tuner input to an encoder input. Note that a switching of services within the digital video recording/reproduction apparatus 200 would be accompanied by a start of recording (i.e., recording must be stopped before the switching of services, and resumed thereafter).

Hereinafter, referring to FIGS. 3 to 8, the processes performed by the respective component elements of the medium control section 209 will be specifically described. FIGS. 3 to 7 are flowcharts showing flows of operations made by the table initialization section 500, the PID detection section 501, the PID conversion section 503, the PAT update section 504, and the PMT update section 505, respectively. FIG. 8 is a diagram illustrating an example structure of the PID conversion table 502.

Figure 3:
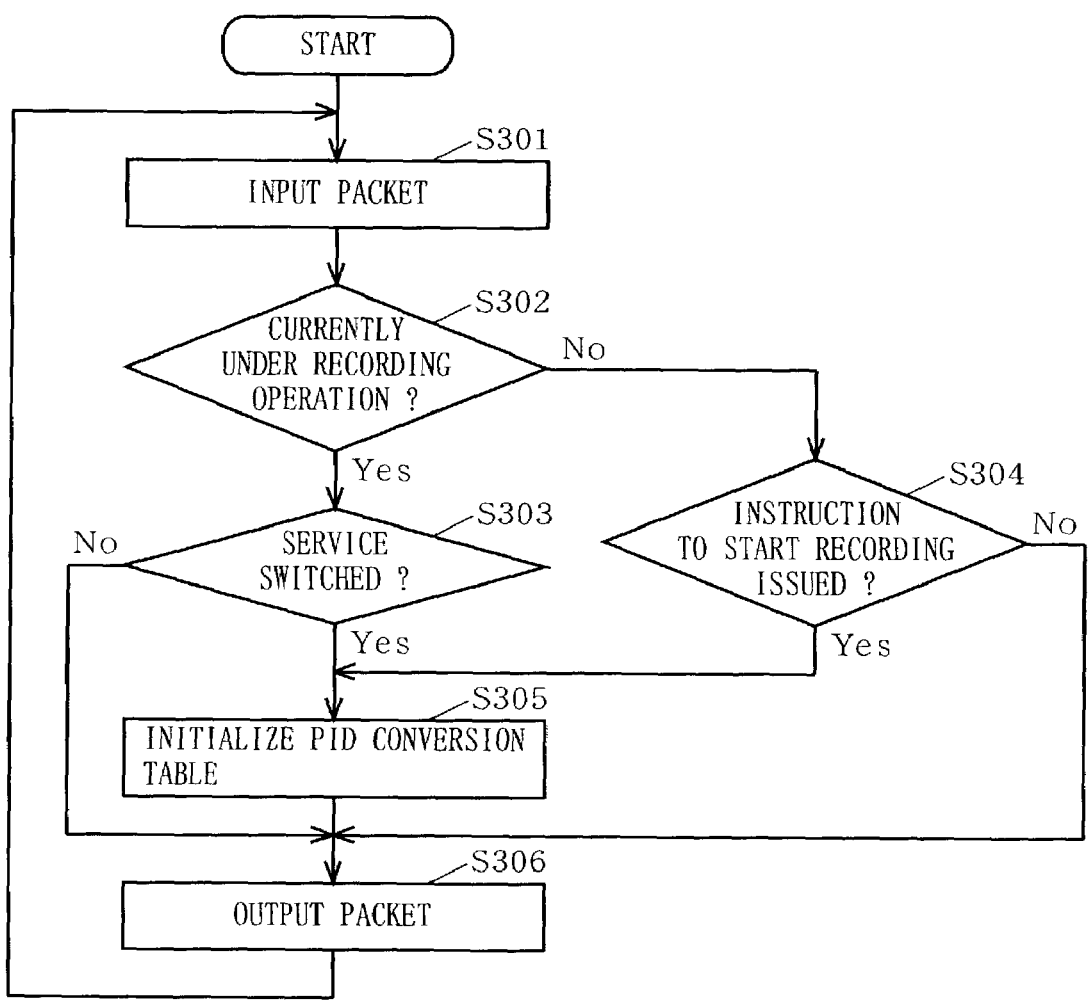
FIG. 3 is a flowchart showing a flow of operations made by a table initialization section 500 shown in FIG. 2.

Referring to FIG. 3, a process performed by the table initialization section 500 will be described.

First, a packet is received via the digital interface 204 (step S301). It is determined whether the apparatus is currently performing a recording operation or not (step S302). If the apparatus is currently performing a recording operation, it is further determined whether the service in the stream has been switched or not (step S303). The determination as to whether the service has been switched or not can be facilitated by referring to the information of a PAT or a SIT which may be contained in the packet. If the service has not been switched, the table initialization section 500 passes the inputted packet to the PID detection section 501 as it is (step S306). If the service has been switched, the table initialization section 500 initializes the PID conversion table 502 (step S305) and thereafter sends the inputted packet to the PID detection section 501 (step S306). On the other hand, if the apparatus is not currently performing a recording operation, then it is determined whether or not an instruction to start recording has been issued (step S304). If there has not been an instruction to start recording, the table initialization section 500 passes the inputted packet to the PID detection section 501 as it is (step S306). If there has been an instruction to start recording, the table initialization section 500 initializes the PID conversion table 502 (step S305) and thereafter sends the inputted packet to the PID detection section 501 (step S306). The above process is repeatedly performed for each inputted packet.

Figure 4:
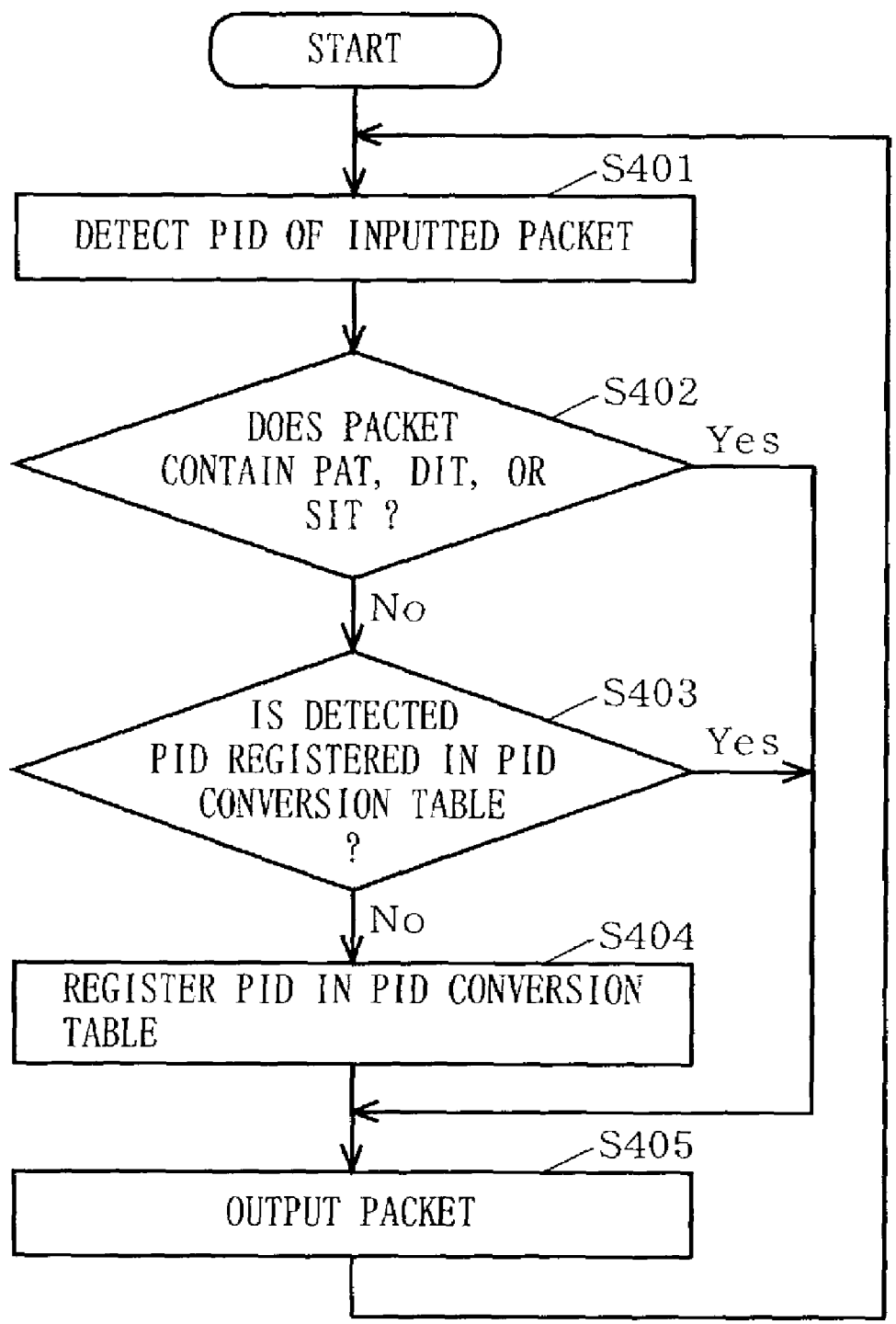
FIG. 4 is a flowchart showing a flow of operations made by a PID detection section 501 shown in FIG. 2.

Referring to FIG. 4, a process performed by the PID detection section 501 will be described.

The packet outputted from the table initialization section 500 is received, and a PID written in a header portion of the packet is detected (step S401). Next, based on the detected PID, it is determined whether or not the inputted packet is a packet containing any of a PAT, a DIT, and an SIT (step S402). If the packet is determined to contain anything but a PAT, a DIT, or an SIT, then it is confirmed whether the detected PID is registered in the PID conversion table 502 or not (step S403). If the detected PID is not found registered in the PID conversion table 502, a registration process for this PID is performed in a manner described later (step S404). Thus, the PID conversion table 502 concerning PMT_PID or ES_PID can be generated. After the PID registration is completed, the inputted packet is outputted to the PID conversion section 503 (step S405). On the other hand, if the packet is determined to contain any of a PAT, a DIT, and an SIT (following the "Yes" path from step S402), or if the detected PID is found registered in the PID conversion table 502 (following the "Yes" path from step S403), inputted packet is outputted to the PID conversion section 503 without performing a PID registration process (step S405). The above process is repeatedly performed for each inputted packet.

The above example illustrates a case where a PID is detected for each inputted packet, and the detected PID's are registered in the PID conversion table 502 as necessary. Alternatively, the digital video recording/reproduction apparatus 200 may be arranged so that, when a packet containing a PAT is inputted, a PMT_PID is registered by examining the content of the PAT, and when a packet containing a PMT is inputted, all ES_PID's are registered by examining the content of the PMT. As a result, any lag associated with the generation of the PID conversion table 502 can be minimized.

Referring to FIG. 8, the PID conversion table 502 will be described.

As shown in FIG. 8, for each PID which has been determined by the PID detection section 501 to be registered, the PID conversion table 502 individually stores a converted PID which is correspondingly assigned to that PID. The converted PID's are assigned in such a manner that, the value of each PID varies before and after any discontinuity occurring in the stream that is associated with a start of recording or a switching of the inputted service. It suffices if the PID values are different before and after a discontinuity in the stream. However, it is preferable to assign a value which has never been previously used to be each converted PID value. For example, this can be easily accomplished by retaining the last-used PID value and always assign a value which is incremented therefrom. Moreover, the last-used PID may be stored in a predetermined non-volatile memory so that the same PID value will not be assigned when the apparatus is reactivated. In this case, the PID stored in the non-volatile memory may simply be read and assigned when the apparatus is again turned on, whereby the use of overlapping PID values can be prevented.

Figure 5:
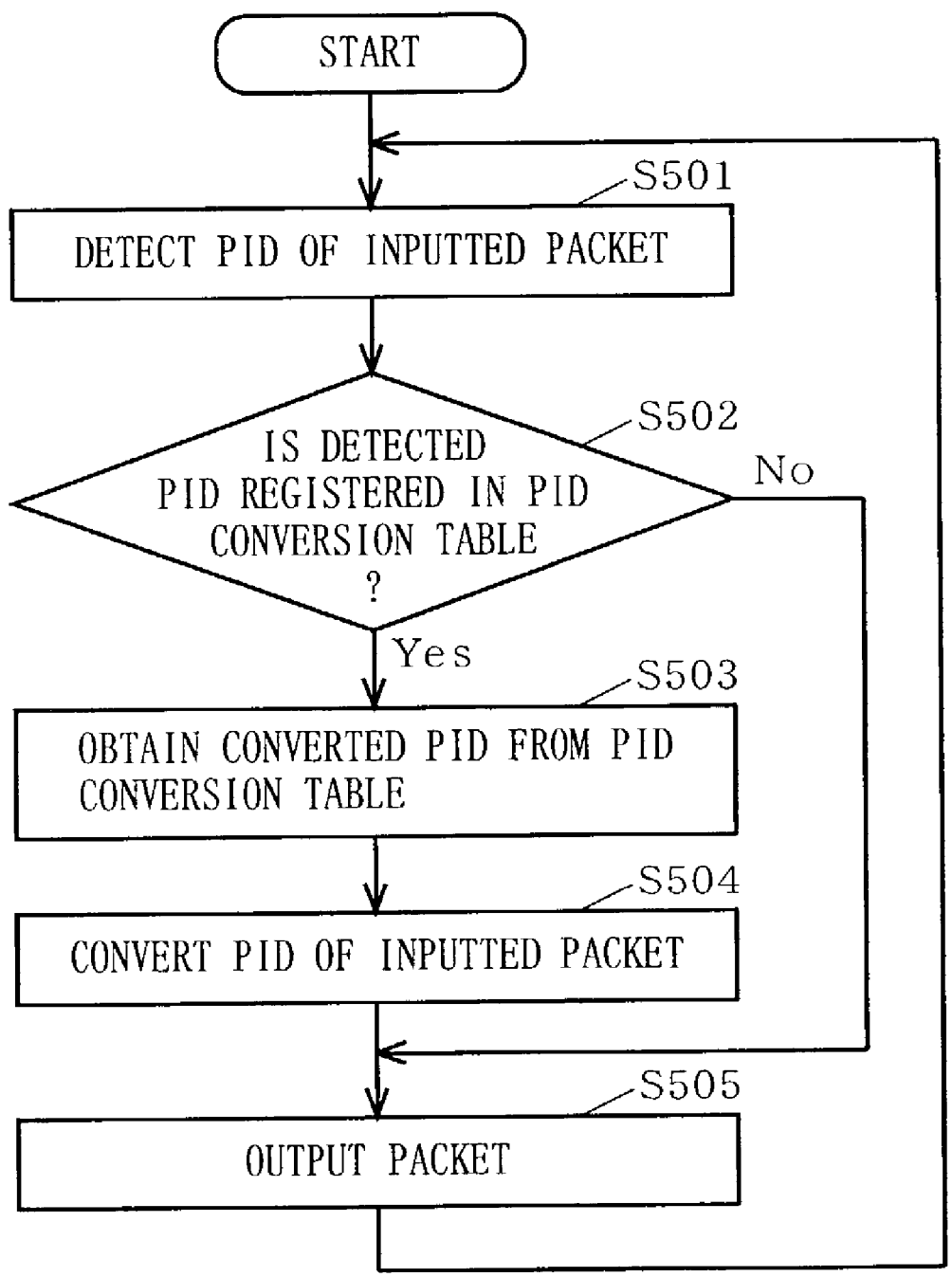
FIG. 5 is a flowchart showing a flow of operations made by a PID conversion section 503 shown in FIG. 2.

Referring to FIG. 5, a process performed by the PID conversion section 503 will be described.

The packet outputted from the PID detection section 501 is received, and a PID written in a header portion of the packet is detected (step S501). Then, it is confirmed whether the detected PID is registered in the PID conversion table 502 or not (step S502). If the detected PID is found registered in the PID conversion table 502, a corresponding converted PID is obtained from the PID conversion table 502, and the PID of the inputted packet is updated from its current value to the converted value (steps S503, S504). After the PID conversion is completed, the inputted packet is outputted to the PAT update section 504 (step S505). On the other hand, if the detected PID is not found registered in the PID conversion table 502 (following the "No" path from step S502), then the inputted packet is outputted to the PAT update section 504 without converting the PID (step S505). The above process is repeatedly performed for each inputted packet.

Figure 6:
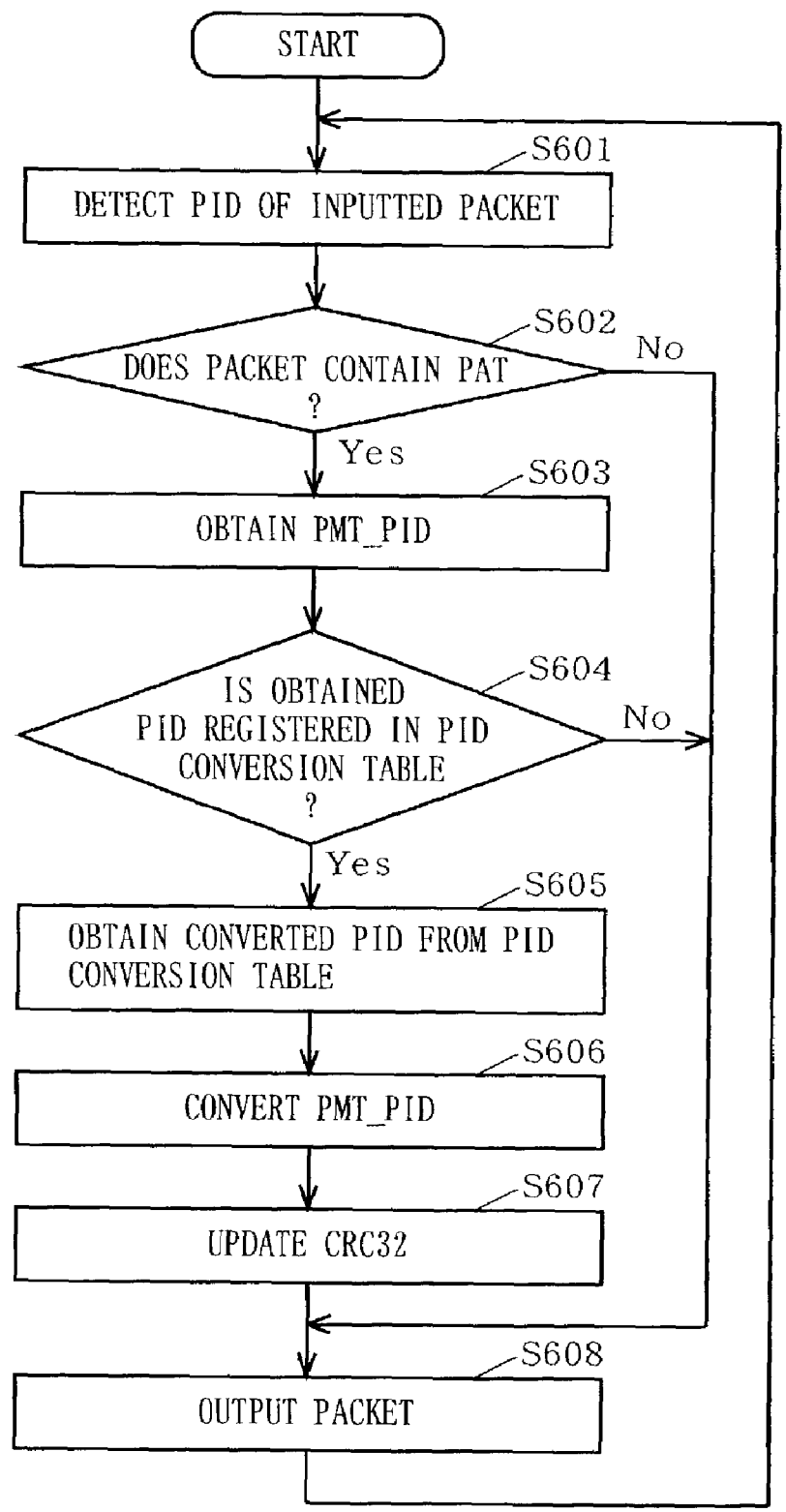
FIG. 6 is a flowchart showing a flow of operations made by a PAT update section 504 shown in FIG. 2.

Referring to FIG. 6, a process performed by the PAT update section 504 will be described.

The packet outputted from the PID conversion section 503 is received, and a PID written in a header portion of the packet is detected (step S601). Then, based on the detected PID, it is determined whether the inputted packet is a packet containing a PAT or not (step S602). If the packet is determined to contain a PAT, a PMT_PID described in the PAT is obtained (step S603). Next, it is confirmed whether a converted value corresponding to the obtained PMT_PID (i.e., a PID of the packet containing a PMT) is registered in the conversion table 502 or not (step S604). If the PID is found registered in the PID conversion table 502, a converted PID is obtained from the PID conversion table 502, the PMT_PID is updated from its current value to the converted value, and a CRC32 described in the PAT is updated (steps S605 to S607). After the conversion of the PMT_PID and CRC32 has been completed, the inputted packet is outputted to the PMT update section 505 (step S608). On the other hand, if the PID is not found registered in the PID conversion table 502, then the inputted packet is outputted to the PMT update section 505 without converting the PMT_PID or CRC32 (step S608). The above process is repeatedly performed for each inputted packet.

Figure 7:
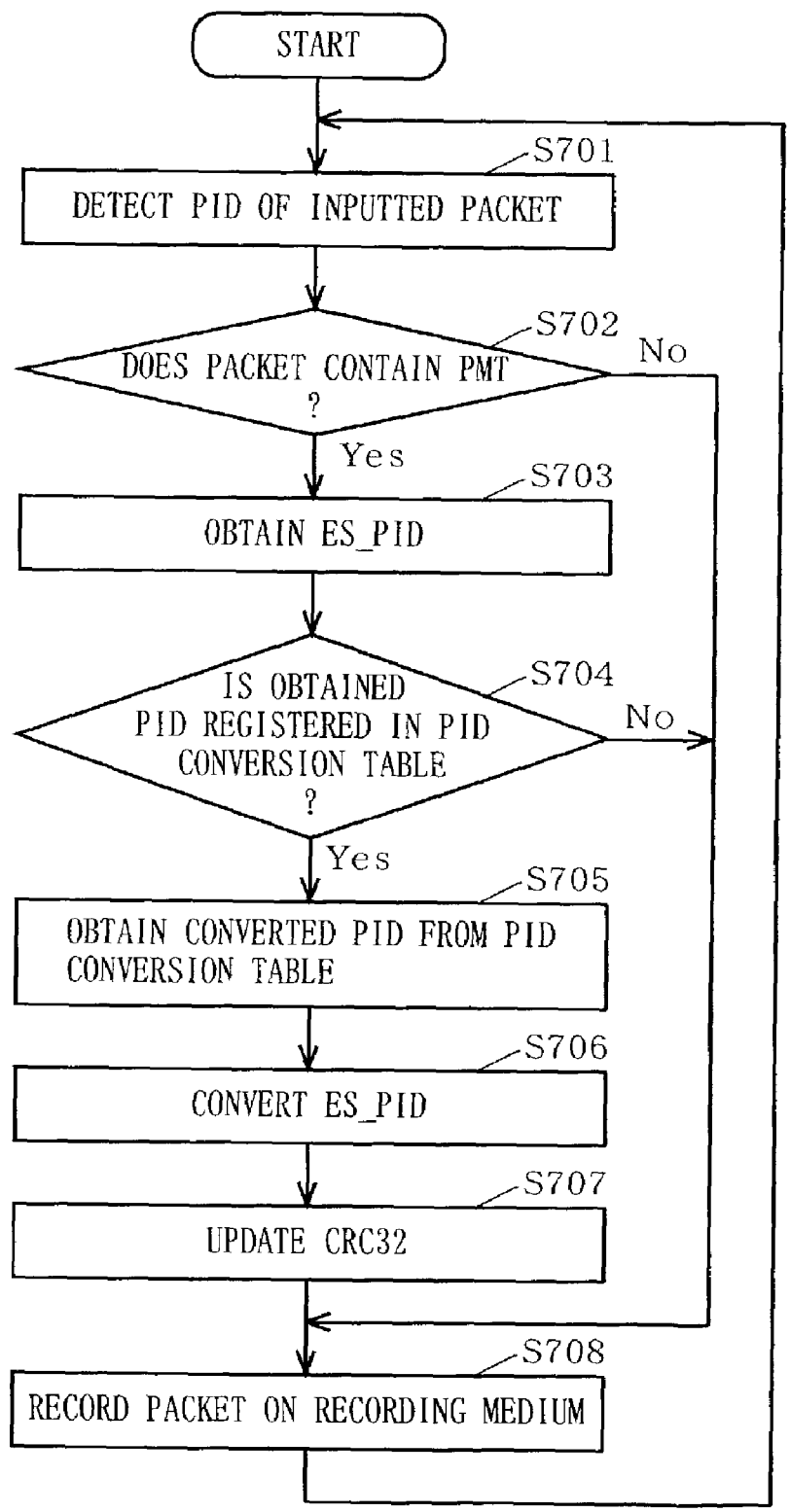
FIG. 7 is a flowchart showing a flow of operations made by a PMT update section 505 shown in FIG. 2.
Figures 8, 9:
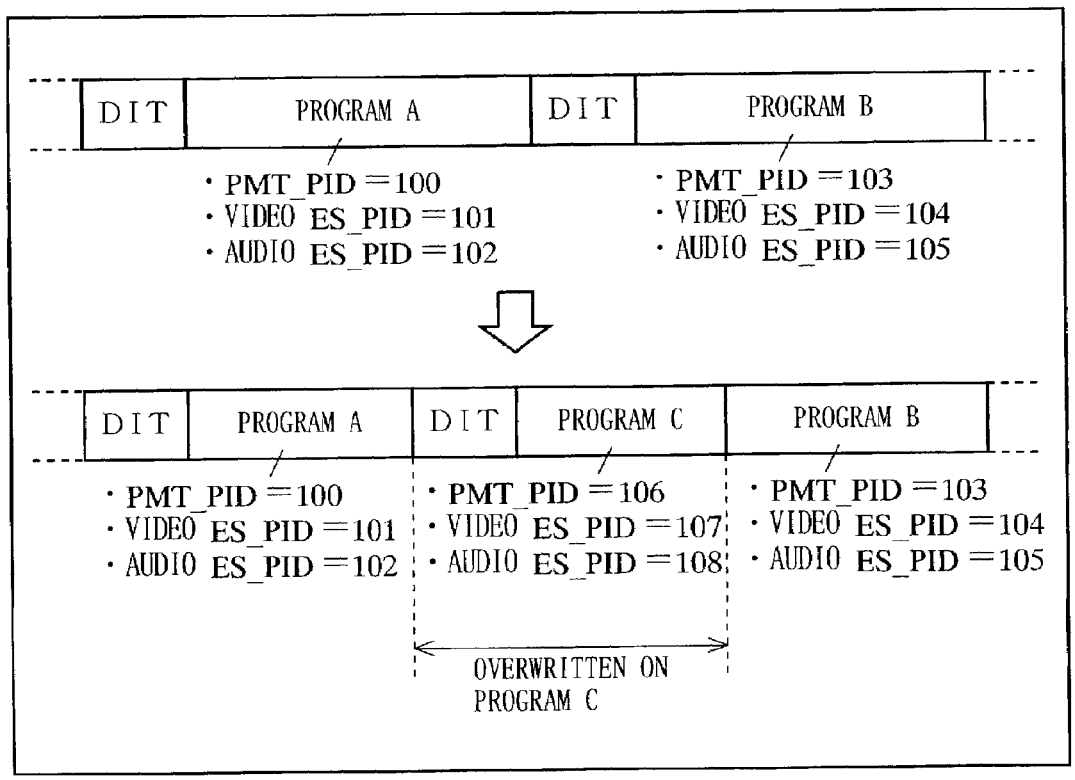
FIG. 8 is a diagram illustrating an example structure of a PID conversion table 502 shown in FIG. 2.
FIG. 9 is a schematic illustration of how a partial TS may be recorded on a recording medium 210 through the processing according to the first embodiment of the present invention.

Referring to FIG. 7, a process performed by the PMT update section 505 will be described.

The packet outputted from the PAT update section 504 is received, and a PID written in a header portion of the packet is detected (step S701). Then, based on the detected PID, it is determined whether the inputted packet is a packet containing a PMT or not (step S702). If the packet is determined to contain a PMT, an ES_PID described in the PMT is obtained (step S703). Next, it is confirmed whether a converted value for the obtained ES_PID (i.e., a PID of the packet containing an ES) is registered in the PID conversion table 502 or not (step S704). If the PID is found registered in the PID conversion table 502, a converted PID is obtained from the PID conversion table 502, the ES_PID is updated from its current value to the converted value, and the CRC32 described in the PMT is updated (steps S705 to S707). After the conversion of the ES_PID and CRC32 has been completed, the inputted packet is recorded on the recording medium 210 (step S708). On the other hand, if the PID is not found registered in the PID conversion table 502, then the inputted packet is recorded on the recording medium 210 without converting the ES_PID or CRC32 (step S708). By repeating the above process for each inputted packet, the program of interest is gradually recorded on the recording medium 210.

In the case where a plurality of PMT_PID's are described in a given PAT, the PID conversion table 502 may be generated with respect to all of the PMT_PID's, or with respect to some of the PMT_PID's. In this case, a step of extracting a PMT_PID may be inserted after step S402 in FIG. 4, and a PID conversion table 502 may be generated with respect to each PMT_PID. At step S603 in FIG. 6, the obtained PMT_PID may be compared against the PID's of the PMT's registered in the PID conversion table 502, and only the necessary PMT_PID's may be updated.

In the case where a plurality of ES_PID's are described in a given PMT, the PID conversion table 502 may be generated with respect to all of the ES_PID's, or with respect to some of the ES_PID's. In this case, a step of extracting an ES_PID may be inserted after step S402 in FIG. 4, and a PID conversion table 502 may be generated with respect to each ES_PID. At step S703 in FIG. 7, the obtained ES_PID may be compared against the PID's of the ES's registered in the PID conversion table 502, and only the necessary ES_PID's may be updated.

By recording a partial TS on the recording medium 210 through the above-described processes, it can be ensured as shown in FIG. 9 that, even if new program C is overwritten part of the way down a program A and part of the way into the following program B, different PMT_PID's and ES_PID's are used between the programs before and after each discontinuity.

Note that the processes described with reference to the flowcharts of FIGS. 3 to 7 are independent from one another. It would be possible to perform parallel processes for the packets by sequentially outputting inputted packets in relay fashion.

(4) Description of a Reproduction Process by the Digital Broadcast Receiver 100

Figure 10:
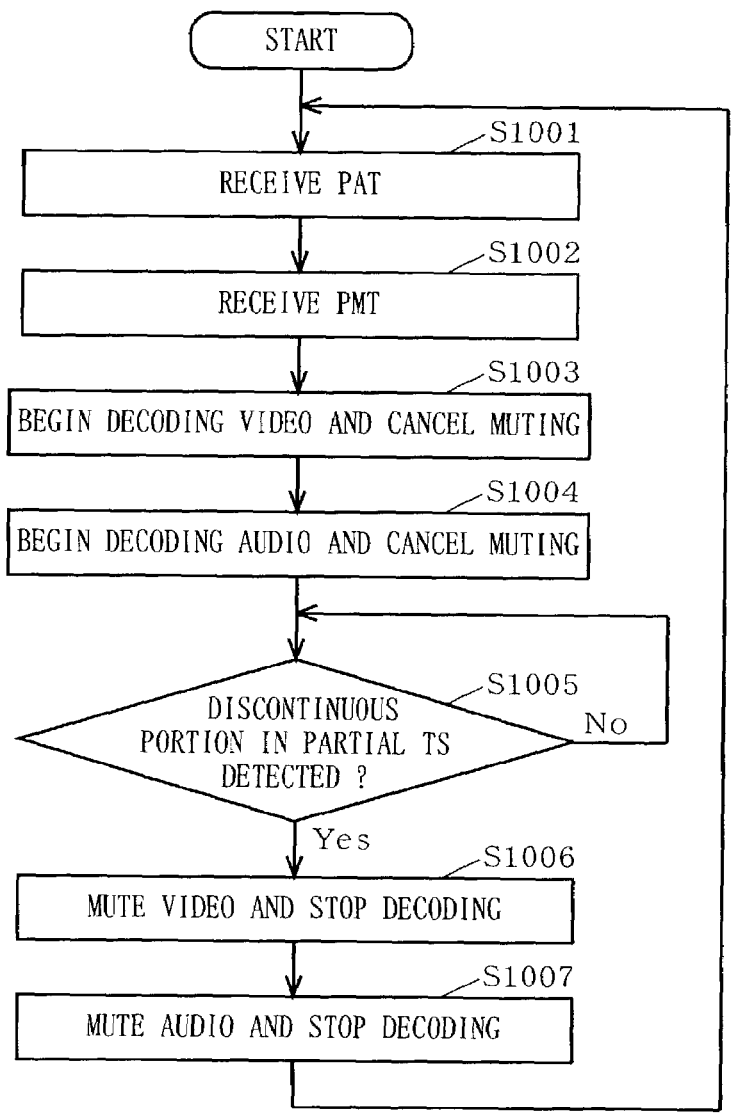
FIG. 10 is a flowchart showing a flow of operations made by a digital broadcast receiver 100.

Lastly, a process by the digital broadcast receiver 100 of decoding and reproducing a partial TS recorded on the recording medium 210 by the above-described method, which has been read by the digital video recording/reproduction apparatus 200, will be described. FIG. 10 is a flowchart showing a flow of operations made by the digital broadcast receiver 100.

As shown in FIG. 10, the partial TS recorded on the recording medium 210 is read by the medium control section 209 in the digital video recording/reproduction apparatus 200, and inputted to the TS demultiplexer 107 in the digital broadcast receiver 100 via the digital interfaces 204 and 109. First, the TS demultiplexer 107 receives a PAT of the first program (step S1001). Next, a PMT corresponding to a program_number described in the received PAT is received (step S1002). The AV decoder 108 begins decoding audio and video of the first program described in the PMT received by the TS demultiplexer 107, and cancels muting (steps S1003, S1004). The decoded video is outputted to the monitor 121, and the decoded audio is outputted to the loudspeaker 122, whereby the first program is reproduced.

While the first program is being reproduced, the TS demultiplexer 107 keeps monitoring for a discontinuous portion in the partial TS, i.e., a next program (step S1005). The detection of a discontinuous portion is performed based on: whether a DIT has been received; whether a PAT which contains no service description (i.e., no program_number) has been received; whether the PMT_PID described in a PAT has taken a different value than before; or whether the ES_PID described in a PMT has taken a different value than before. If a discontinuous portion in the partial TS is detected by the TS demultiplexer 107, the AV decoder 108 mutes the audio and video of the first program and stops decoding (steps S1006, S1007).

After temporarily muting the audio and video and stopping decoding for the first program, the TS demultiplexer 107 receives a new PAT associated with the next program (step S1001). Next, a new PMT corresponding to the program_number described in the received new PAT is received (step S1002). The AV decoder 108 begins decoding the audio and video of this next program described in the new PMT received by the TS demultiplexer 107, and cancels muting (steps S1003, S1004). The decoded video is outputted to the monitor 121, and the decoded audio is outputted to the loudspeaker 122, whereby this next program is reproduced.

By repeating the above process, each new program can precisely undergo a reproduction process each time a discontinuous portion is detected in a partial TS.

The decoding of audio and video by the AV decoder 108 is begun as the TS demultiplexer 107 sets ES_PID's for the audio and video to be decoded and sends the audio and video ES's which are associated with these ES_PID's to the AV decoder 108. Once the audio and video ES's which are associated with the ES_PID's set by the TS demultiplexer 107 are depleted, the audio and video decoding stops because ES's are no longer outputted to the AV decoder 108.

Thus, in the case where a partial TS whose ES_PID's are changed at the time of recording is decoded, even if the detection of a discontinuous portion occurs later than the actual reading of the discontinuous portion, the audio and video decoding is once stopped and thereafter the decoding of the next audio and video will be smoothly begun.

As described above, in accordance with the digital video recording/reproduction apparatus of the first embodiment, a PMT_PID or an ES_PID contained in each packet of a partial TS is recorded on a recording medium in such a manner that it takes a different value each time there is a discontinuity in the stream. As a result, in a reproduction process of a recording medium which has been recorded in this manner, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated.

The present embodiment illustrates an example where the packets whose PID's are to be changed are packets containing a PMT and packets containing an ES. However, it will be appreciated that the present invention is generally applicable to packets containing anything but a PAT, a DIT or an SIT. Alternatively, only packets containing a PMT may undergo the change of PID, or only packets containing an ES may undergo the change of PID. In the latter case, the PAT update section 504 can be omitted since it is not necessary to convert a PMT_PID.

The above embodiment illustrates an example where the PID conversion is effected when recording a partial TS on the recording medium 210, by employing the table initialization section 500, the PID detection section 501, the PID conversion table 502, the PID conversion section 503, the PAT update section 504, and the PMT update section 505. Alternatively, a partial TS may simply be recorded on a recording medium 210 in a regular manner, and the PID conversion may be performed as necessary when performing a reproduction process, through the use of the same set of component elements. Such a technique would be applicable to recording media which manage recordable contents in a file format, e.g., HDD's and DVD's. In this case, the determination of a start of recording and a switching of services performed by the table initialization section 500 can be made based on a change of the file numbers which are read from the recording medium. In the case where a content is recorded on a recording medium, a list of PID's and/or PMT information may be previously recorded on the recording medium as separate information for use in the determination of converted PID's.

(Second Embodiment)

The above-described first embodiment illustrates a technique which is applicable to various types of recording media, the technique being based on a special process which is performed at the time of recording a partial TS. A second embodiment of the present invention is applicable to magnetic-tape recording media, and illustrates a digital video recording/reproduction apparatus which, without having to perform any special recording process and by taking advantage of the characteristics of conventional recording methods, is capable of performing a precise reproduction process while preventing noise generation.

The second embodiment is identical to the first embodiment except for item (3') instead of the above-described item (3). Hereinafter, the second embodiment will be described mainly with respect to (3') below.

(3') Detailed Description of a Reproduction Operation by the Digital Video Recording/Reproduction Apparatus 200

Figure 11:
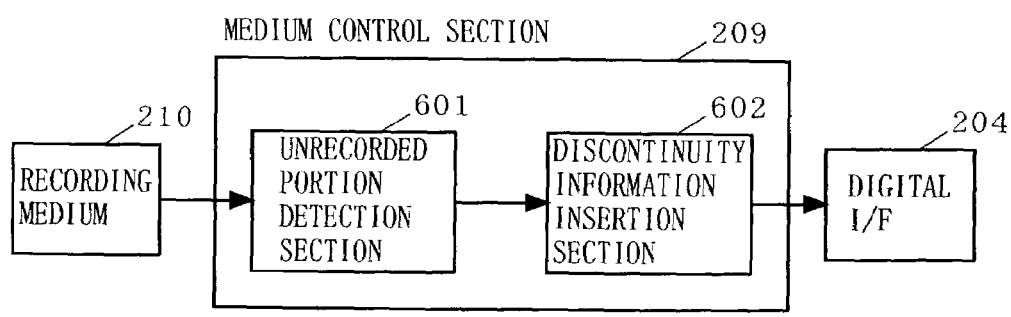
FIG. 11 is a block diagram showing the detailed structure of a medium control section 209 according to a second embodiment of the present invention.
Figure 12:
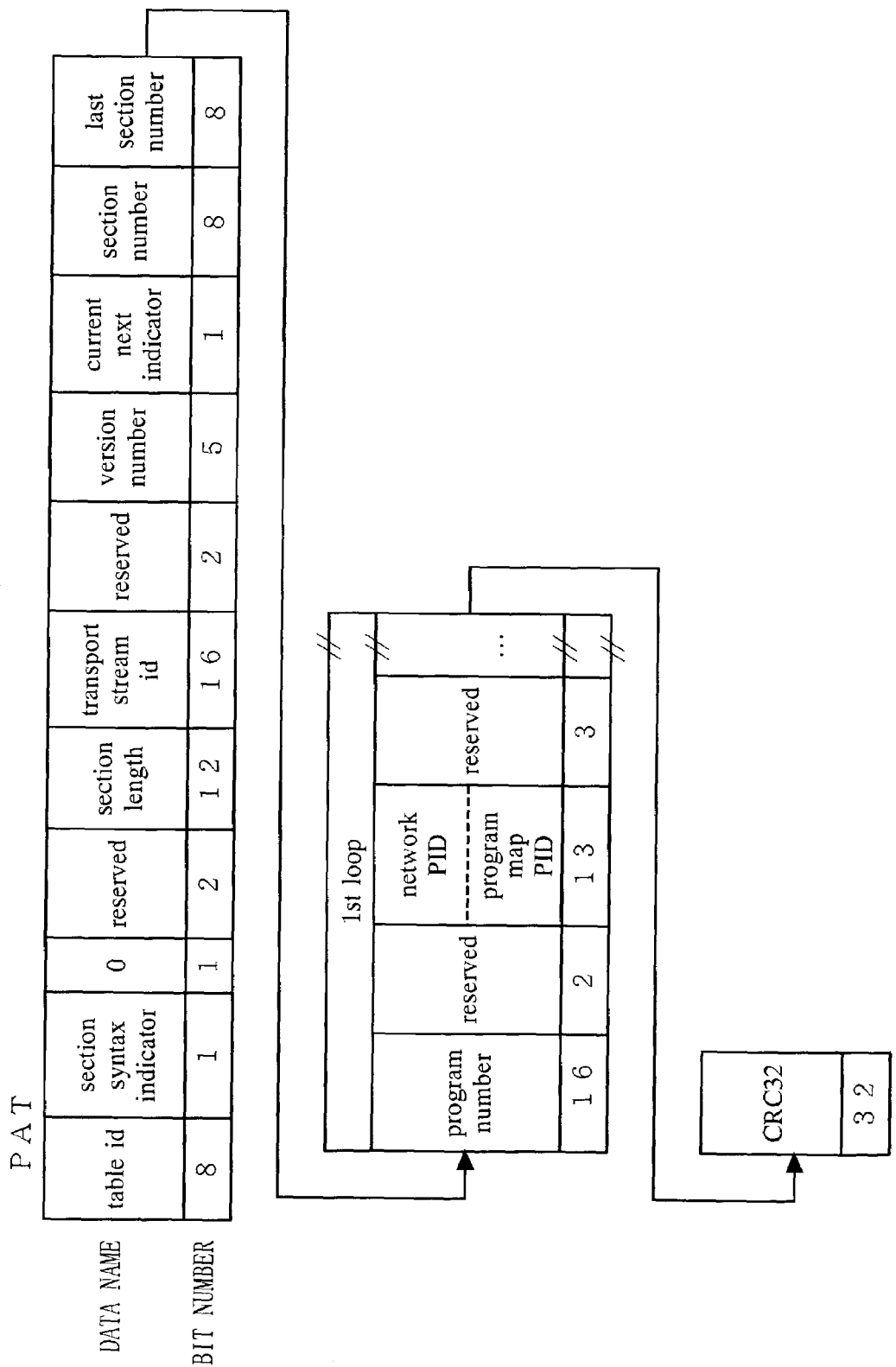
FIG. 12 is a diagram illustrating a PAT format.
Figure 13:
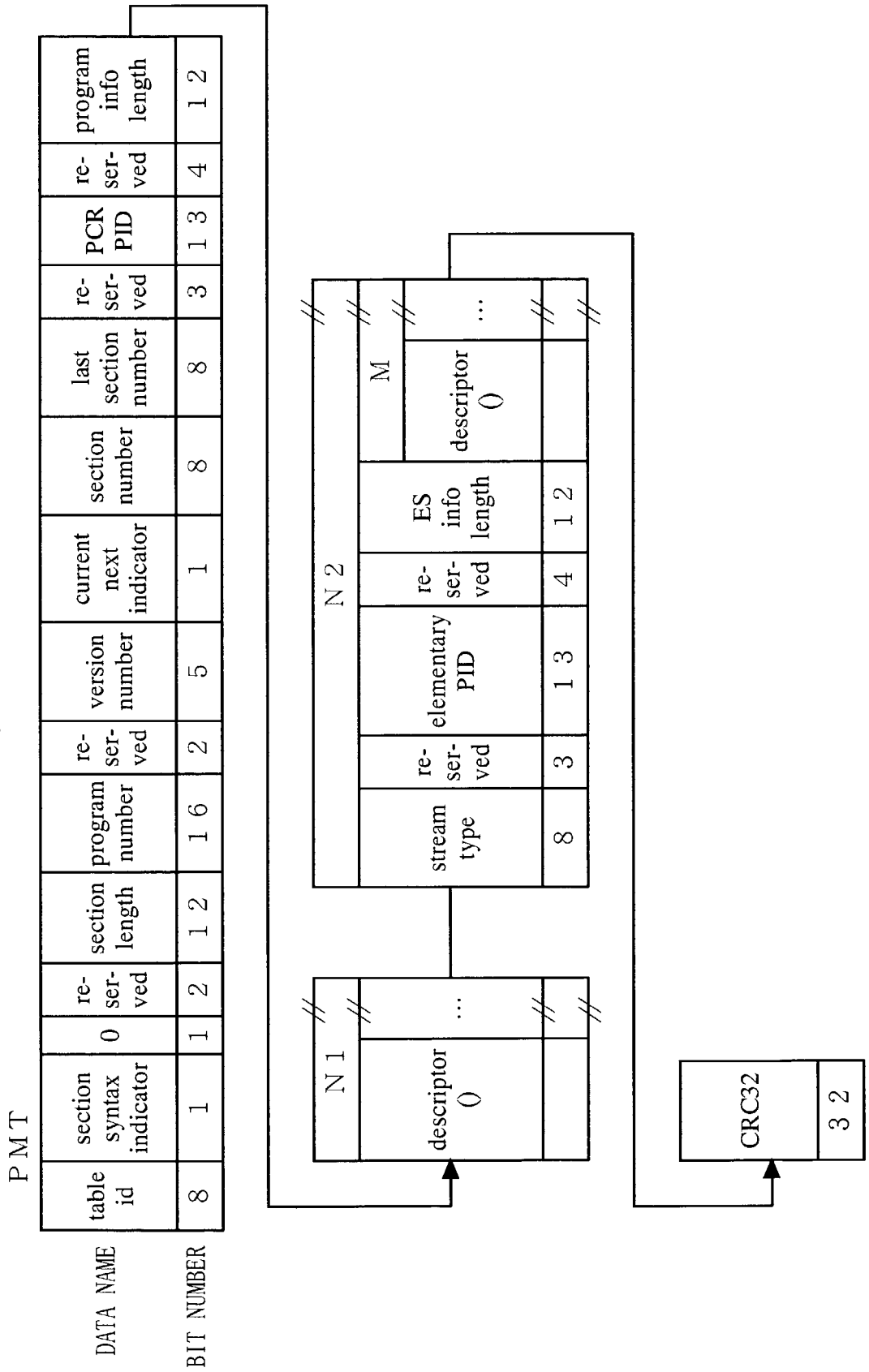
FIG. 13 is a diagram illustrating a PMT format.
Figure 14:
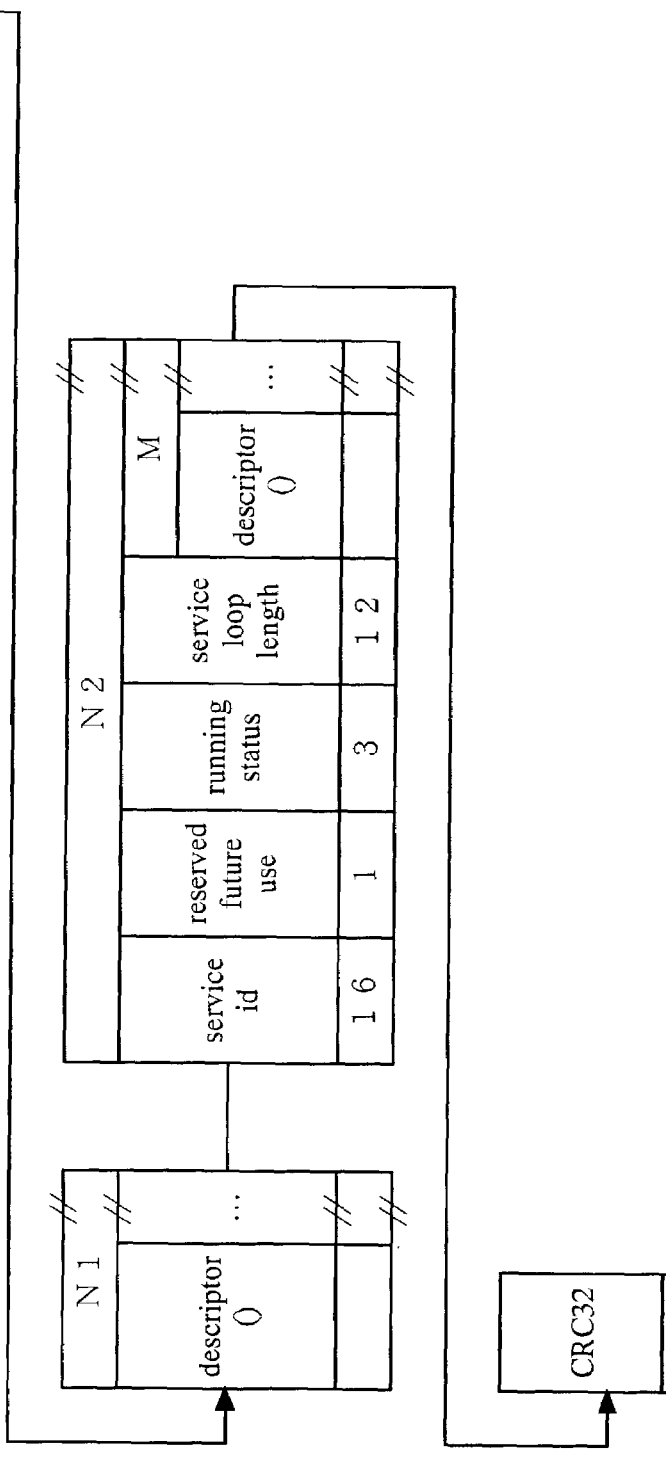
FIG. 14 is a diagram illustrating an SIT format.

FIG. 11 is a block diagram showing the detailed structure of the medium control section 209 of the digital video recording/reproduction apparatus 200, which needs to be employed during reproduction. As shown in FIG. 11, the medium control section 209 comprises an unrecorded portion detection section 601 and a discontinuity information insertion section 602.

As is well known, when data is newly recorded on magnetic tape, previously-recorded data is first erased by means of an erase head (thereby creating an unrecorded portion), and thereafter the new data is written by means of a recording head. Therefore, so long as there is any distance between the erase head and the recording head, at least some unrecorded portion will inevitably be left after data recording is stopped.

The unrecorded portion detection section 601 detects such an unrecorded portion at the time of reading a partial TS from the recording medium 210. If an unrecorded portion is detected by the unrecorded portion detection section 601, the discontinuity information insertion section 602 inserts discontinuity information in a corresponding position in the partial TS which has been read, and outputs the resultant partial TS to the digital interface 204. A DIT or a PAT can be utilized as the discontinuity information. A DIT may be inserted before a first packet which is read after the unrecorded portion is detected, or introduced so as to replace such a packet. Alternatively, a PAT which is generated so as not contain any description of a PMT_PID can be inserted before a first packet which is read after the unrecorded portion is detected. Thus, it becomes possible to detect discontinuity in the digital broadcast receiver 100. Two or more contiguous units of such discontinuity information are preferably inserted in case a detection failure occurs in the digital broadcast receiver 100.

On the other hand, if no unrecorded portion is detected by the unrecorded portion detection section 601, the discontinuity information insertion section 602 simply passes the partial TS having been read to the digital interface 204 as the reproduced stream.

As described above, in accordance with the digital video recording/reproduction apparatus of the second embodiment, by relying on unrecorded portions which are conventionally present on a recording medium, discontinuity information is inserted in the reproduced partial TS, or the partial TS is partly replaced with discontinuity information, every time a discontinuity occurs in a stream. As a result, in a reproduction process of a conventional recording medium, especially when data which has been overwritten on an already-recorded medium is to be reproduced, the discontinuous portion in the stream (i.e., the recorded portion immediately following the overwritten portion) can be easily determined. Thus, a precise reproduction process can be performed while preventing noise from being generated.

The second embodiment illustrates a technique where a DIT or a PAT is inserted in the reproduced partial TS which is sent from the digital video recording/reproduction apparatus 200 to the digital broadcast receiver 100. Alternatively, if a control line (e.g., a serial interface) which is capable of transmitting control data is coupled between the digital video recording/reproduction apparatus 200 to the digital broadcast receiver 100, similar effects can be obtained by utilizing such a control line.

Specifically, if the unrecorded portion detection section 601 detects an unrecorded portion, the control line may be set active (e.g., "1"), and the control line may be reset to inactive (e.g., "0") when the unrecorded portion is no longer detected. The digital broadcast receiver 100 may detect this signal on the control line, and stop decoding when it becomes active, for example. As a result, the switching of programs can be notified to the digital broadcast receiver 100, without applying any process to the partial TS, such as altering the PMT_PID or inserting a DIT.

The second embodiment illustrates an example where, when the unrecorded portion detection section 601 detects an unrecorded portion, the discontinuity information insertion section 602 is employed to insert discontinuity information at a corresponding position in the partial TS. Alternatively, instead of employing the discontinuity information insertion section 602, it would be possible to alter the PID upon detection of an unrecorded portion by employing the table initialization section 500, the PID detection section 501, the PID conversion table 502, the PID conversion section 503, the PAT update section 504, and the PMT update section 505 described in the first embodiment.

The digital video recording/reproduction apparatus 200 according to the first and second embodiments can be any device which has the functions of recording and/or reproducing a partial TS, irrespective of whether it takes the form of a digital VCR, a personal computer, or the like.

Furthermore, although the digital video recording/reproduction apparatus 200 according to the first and second embodiments is illustrated as having both a recording function and a reproduction function, the present invention is applicable to an apparatus which has only either one of the two functions. Moreover, the digital broadcast receiver 100 and the digital video recording/reproduction apparatus 200 may be embodied as one integral device.

While the invention has been described in detail, the foregoing description is in all aspects illustrative and not restrictive. It is understood that numerous other modifications and variations can be devised without departing from the scope of the invention.

What is claimed is:

1. A digital video recording apparatus for recording a digital video signal on a recording medium, the digital video signal being inputted in packets, comprising:
   a PID conversion table having registered therein information for converting a PID (packet identifier) assigned to a packet composing the digital video signal;
   a table initialization section for initializing the PID conversion table in response to an instruction to start recording or a switching of services provided in the inputted digital video signal;
   a PID detection section for detecting a PID assigned to each inputted packet of the digital video signal, and for a packet determined as containing control data or video/audio data based on the detected PID, registering a value which is different from a current value as a converted PID for the packet in the PID conversion table;
   a PID conversion section for converting the PID of an inputted packet and the PID of the control data or video/audio data contained therein to the converted PID in accordance with the registered information in the PID conversion table; and
   a recording section for recording the packet whose PID has been converted by the PID conversion section on the recording medium.

2. The digital video recording apparatus according to claim 1,
wherein a PID of a packet containing a PMT and a PID of a packet containing a video/audio ES are registered by the PID detection section in the PID conversion table.

3. The digital video recording apparatus according to claim 2,
wherein the PID detection section sequentially employs a value incremented from a predetermined arbitrary value as a converted PID to be registered in the PID conversion table, and
wherein each incremented value is stored in a non-volatile memory and read out for use from the non-volatile memory when the apparatus is turned on.

4. The digital video recording apparatus according to claim 1,
wherein a PID of a packet containing a PMT is registered by the PID detection section in the PID conversion table.

5. The digital video recording apparatus according to claim 4,
wherein the PID detection section sequentially employs a value incremented from a predetermined arbitrary value as a converted PID to be registered in the PID conversion table, and
wherein each incremented value is stored in a non-volatile memory and read out for use from the non-volatile memory when the apparatus is turned on.

6. The digital video recording apparatus according to claim 1,
wherein a PID of a packet containing a video/audio ES is registered by the PID detection section in the PID conversion table.

7. The digital video recording apparatus according to claim 6,
wherein the PID detection section sequentially employs a value incremented from a predetermined arbitrary value as a converted PID to be registered in the PID conversion table, and
wherein each incremented value is stored in a non-volatile memory and read out for use from the non-volatile memory when the apparatus is turned on.

8. The digital video recording apparatus according to claim 1,
wherein the PID detection section sequentially employs a value incremented from a predetermined arbitrary value as a converted PID to be registered in the PID conversion table, and
wherein each incremented value is stored in a non-volatile memory and read out for use from the non-volatile memory when the apparatus is turned on.

9. A digital video reproduction apparatus for reproducing a digital video signal recorded in a file format on a recording medium in packets, comprising:
a PID conversion table having registered therein information for converting a PID (packet identifier) assigned to a packet composing the digital video signal;
a table initialization section for initializing the PID conversion table in response to a change of file numbers which are read;
a PID detection section for detecting a PID assigned to each read packet of the digital video signal, and for a packet determined as containing control data or video/audio data based on the detected PID, registering a value which is different from a current value as a converted PID for the packet in the PID conversion table;
a PID conversion section for converting the PID of a read packet and the PID of the control data or video/audio data contained therein to the converted PID in accordance with the registered information in the PID conversion table; and
an output section for reproducing and outputting the packet whose PID has been converted by the PID conversion section.

10. A program for causing a computer apparatus to execute a method of recording a digital video signal on a recording medium, the digital video signal being inputted in packets, comprising the steps of:
determining an instruction to start recording or a switching of services provided in the inputted digital video signal;
in response to the instruction or switching, initializing a PID conversion table which has registered therein information for converting a PID (packet identifier) assigned to a packet composing the digital video signal;
detecting a PID assigned to each inputted packet of the digital video signal;
for a packet determined as containing control data or video/audio data based on the detected PID, registering a value which is different from a current value as a converted PID for the packet in the PID conversion table;
converting the PID of an inputted packet and the PID of the control data or video/audio data contained therein to the converted PID in accordance with the registered information in the PID conversion table; and
recording the packet whose PID has been converted by the step of converting on the recording medium.

11. The program according to claim 10,
wherein the step of registering comprises sequentially employing a value incremented from a predetermined arbitrary value as a converted PID to be registered in the PID conversion table, and storing each incremented value in a non-volatile memory and reading out the incremented value from the non-volatile memory for use when the apparatus is turned on.

12. A program for causing a computer apparatus to execute a method of reproducing a digital video signal recorded in a file format on a recording medium in packets, comprising the steps of:
determining a change of file numbers which are read;
in response to the change, initializing a PID conversion table which has registered therein information for converting a PID (packet identifier) assigned to a packet composing the digital video signal;
detecting a PID assigned to each read packet of the digital video signal;
for a packet determined as containing control data or video/audio data based on the detected PID, registering a value which is different from a current value as a converted PID for the packet in the PID conversion table;
converting the PID of a read packet and the PID of the control data or video/audio data contained therein to the converted PID in accordance with the registered information in the PID conversion table; and
reproducing and outputting the packet whose PID has been converted.

* * * * *